(12) United States Patent
Akgun et al.

(10) Patent No.: US 7,039,049 B1
(45) Date of Patent: May 2, 2006

(54) METHOD AND APPARATUS FOR PPPOE BRIDGING IN A ROUTING CMTS

(75) Inventors: Ali Akgun, Chicago, IL (US); John G. Fijolek, Naperville, IL (US); Matthew Tooley, Chicago, IL (US); Vikram Swamy, Chicago, IL (US); John Hamrick, Hoffman Estates, IL (US)

(73) Assignee: 3Com Corporation, Marlborough, MA (US)

(*) Notice: Subject to any disclaimer, the term of this patent is extended or adjusted under 35 U.S.C. 154(b) by 902 days.

(21) Appl. No.: 09/748,588

(22) Filed: Dec. 22, 2000

(51) Int. Cl.
*H04L 12/56* (2006.01)

(52) U.S. Cl. .................. 370/389; 370/395.1; 370/401; 370/475

(58) Field of Classification Search ................ 370/389, 370/395.1, 395.3, 395.31, 395.51, 395.52, 370/395.54, 395.6, 392, 401, 402, 469, 475
See application file for complete search history.

(56) References Cited

U.S. PATENT DOCUMENTS

| | | | | |
|---|---|---|---|---|
| 4,424,565 A | * | 1/1984 | Larson | 709/245 |
| 5,214,646 A | * | 5/1993 | Yacoby | 370/402 |
| 5,280,480 A | * | 1/1994 | Pitt et al. | 370/256 |
| 6,065,061 A | * | 5/2000 | Blahut et al. | 709/239 |
| 6,101,182 A | | 8/2000 | Sistanizadeh et al. | 370/351 |
| 6,618,377 B1 | * | 9/2003 | Miriyala | 370/395.1 |
| 6,781,989 B1 | * | 8/2004 | Acharya | 370/392 |
| 2001/0030977 A1 | * | 10/2001 | May | 370/475 |

OTHER PUBLICATIONS

L. Mamakos, K. Lidl, J. Evarts, D. Carrel, D. Simone, R. Wheeler, "A Method for Transmitting PPP Over Ethernet (PPPoE)," Network Working Group RFC: 2516 (Feb. 1999) 1-15.*
Data-Over-Cable Service Interface Specification—Cable Modem Telephony Return Interface Specification SP-CMTRI-101-970804, Copyright 1997 Cable Television Laboratories, Inc.
Data-Over-Cable Service Interface Specifications—Radio Frequency Interface Specification SP-RFIv.1.1-106-001215, Copyright 1999, 2000 Cable Television Laboratories, Inc.
The Point-to-Point Protocol, http://www.ietf.org/rfc/rfc1661, printed from the World Wide Web on May 3, 2001.
A Method for Transmitting PPP Over Ethernet (PPPoE), http://www.ietf.org/rfc/rfc2516, printed from the World Wide Web on May 3, 2001.

* cited by examiner

*Primary Examiner*—Dang Ton
*Assistant Examiner*—Shick Hom
(74) *Attorney, Agent, or Firm*—McDonnell Boehnen Hulbert & Berghoff LLP

(57) ABSTRACT

A routing Cable Modem Termination System (CMTS) configured to enable Point-to-Point Protocol over Ethernet (PPPoE). The routing CMTS may bridge Ethernet frames related to a PPPoE connection from a first network to a second network. Bridging Ethernet frames allows terminals in different networks to establish a PPPoE connection. A routing CMTS may also collect state information regarding PPPoE connections. The routing CMTS may use the state information to only bridge Ethernet frames related to valid PPPoE connections. It may act as a firewall to prevent spoofing attacks.

3 Claims, 6 Drawing Sheets

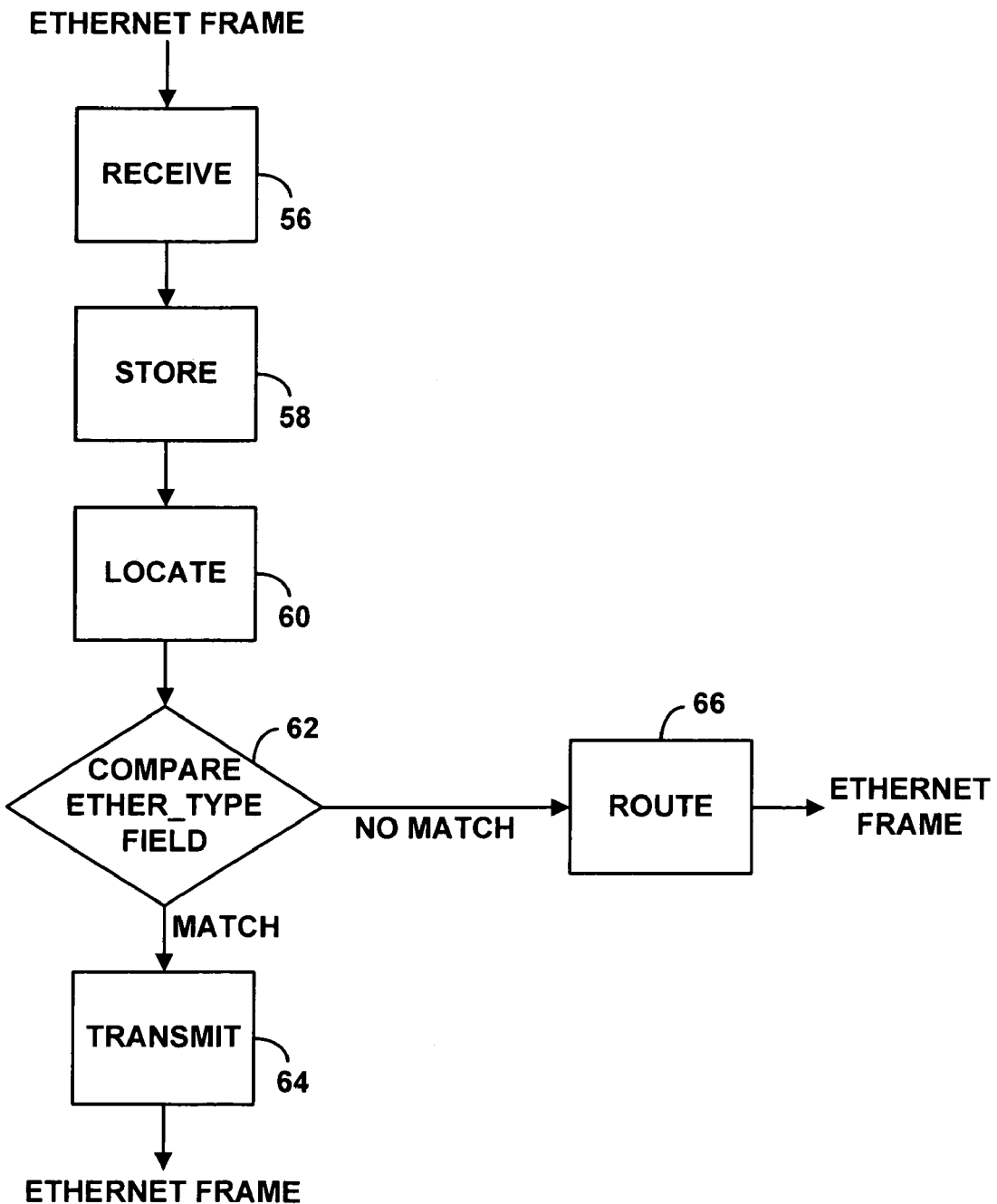

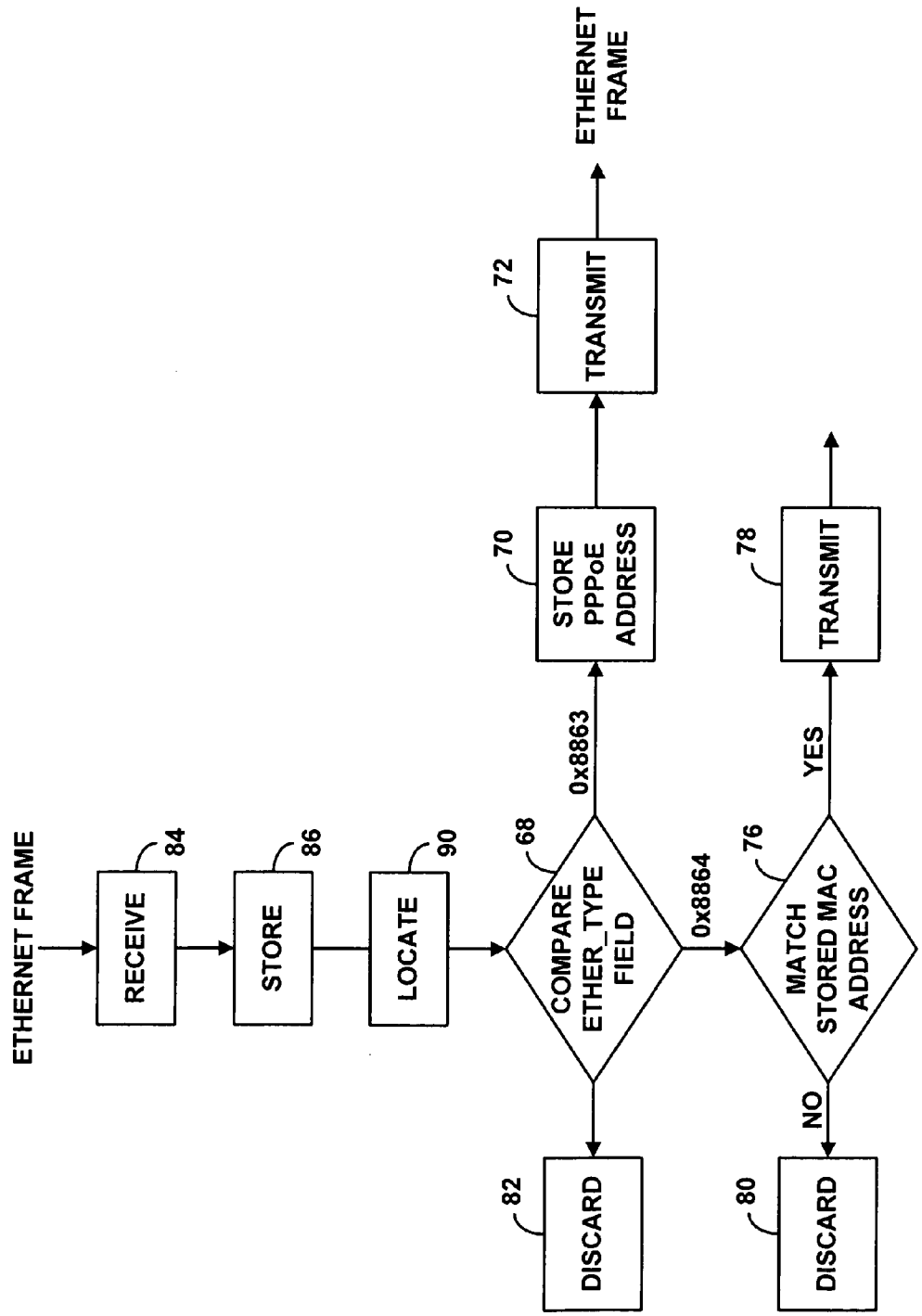

METHOD AND APPARATUS FOR PPPOE BRIDGING IN A ROUTING CMTS

BACKGROUND

1. Field of the Invention

The present invention relates to cable network services and more particularly to a method and apparatus for establishing a point-to-point connection with a terminal residing behind a routing Cable Modem Termination System (CMTS) in a cable television network.

2. Description of Related Art

The primary function of cable television networks is to transport television signals to cable television subscribers. The transport of television signals enables subscribers to receive multiple television programs from multiple broadcasters. The transport of television programs, however, is not the only service that cable television networks offer. Cable Television Laboratories, a consortium of cable television operators, has recently developed a set of standards for transporting data over the cable network. Data-Over-Cable Service Interface Specification (DOCSIS) and euro-DOCISIS (collectively referred to as "the DOCSIS standard") define system specifications to facilitate the exchange of data over the cable network. DOCSIS offers cable television customers high-speed data connectivity between terminals on and off the cable network.

DOCSIS defines the architecture for transporting data over the cable network. The DOCSIS architecture may have five types of network elements: wide area networks (WAN), cable networks, cable modems, routing Cable Modem Termination Systems (CMTSs), and terminals. Each network element may be coupled together. For example, the WAN may be coupled to the routing CMTS, the cable network may be coupled to the routing CMTS, and the cable modem may be coupled to the cable network. Other arrangements, however, are also possible.

A WAN is a data network. Typically, it is an interconnect of terminals that exchange packets over a communications network. The cable network is also an interconnect of terminals. Like the WAN, the cable network may also enable terminals to exchange packets over the cable network. Unlike the WAN, it may also transport television signals.

The routing CMTS may be an intermediate point of termination between the WAN and the cable network. It may serve as an interface between the two networks. The function of the routing CMTS may be to route downstream and upstream traffic, between the cable network and the WAN.

"Downstream traffic" is packets directed to at least one cable modem coupled to the cable network. The routing CMTS may regulate the downstream traffic by receiving packets from the WAN and transmitting packets over the cable network to the at least one cable modem.

"Upstream traffic" is packets originating from at least one cable modem. The routing CMTS may regulate the upstream traffic by allowing only one cable modem to transmit upstream at a time. A cable modem wishing to transmit packets upstream may transmit a data request to the routing CMTS. When a channel is available, the routing CMTS may grant the cable modem's data request. The cable modem may then transmit its packets.

DOSCIS defines a seven layer protocol that network devices may conform to in order to exchange packets over the cable television network. The seven layer protocol enables the products of different manufacturers to interoperate. Each layer of the protocol may perform a specific function. For example, layers 1 to 3 deal with network access and layers 4 to 7 deal with end-to-end communications between two or more terminals on the network.

Layers 2 and 3, the Data Link layer and Network layer, deal specifically with routing packets over the cable network. The Data Link layer defines the procedures and protocols for controlling access to a communication channel shared by two or more terminals. The Data Link layer is comprised of two sub-layers. One of the sub-layers is called the MAC sub-layer. The MAC sub-layer may control a terminal's access to the cable network. For example, it may use a location-independent 48 bit MAC sub-layer address to route packets to a specific terminal. The MAC sub-layer address is a unique address assigned to each terminal to facilitate the transport of packets to the terminal.

The Network layer is one layer above the Data Link layer. Unlike the Data Link layer, the Network layer defines the protocol for transmitting packets between physical networks. Each physical network is assigned a unique 32 bit network layer address. The Network layer may use the 32 bit network layer address to route packets to the physical network on which a terminal is located. Like the MAC sub-layer address, packets destined to a specific terminal may contain a network layer address. Unlike the MAC sub-layer address, however, the network layer address may be location-dependent. If a terminal is moved to a different network, the packets may use a different network layer address in order to reach the terminal.

Operating together, the network layer address and MAC sub-layer address may enable a network device to route packets to a specific terminal on the cable network. For example, a routing CMTS may use the network layer address to route packets to the physical network on which the terminal is located. A cable modem may use a MAC sub-layer address to receive packets addressed to a specific terminal.

One advantage of using the MAC sub-layer address is that it may enable network devices to shape data traffic to a terminal. Network devices may use the MAC sub-layer address to ensure that terminals are guaranteed a specific level of service. For example, a network device may route packets at a fixed rate to the terminal identified by the MAC sub-layer address. Therefore, along with enabling the transport of data over the cable network, DOCSIS may enables the cable network to provision services on a per-terminal basis.

Users, however, may not be satisfied with the provisioning of services on a per-terminal basis. Users typically desire network services on a per-user basis. One way to provision services on a per-user basis may be to establish a point-to-point connection between two or more terminals. Request for Comments 2516 of the Internet Engineering Task Force (IETF) defines a protocol for establishing a point-to-point connection over Ethernet (PPPoE). PPPoE enables a network to identify a connection according to the users on it, rather than according to the physical terminals on it. Therefore, the network may be able to allocate a particular bandwidth to a physical terminal depending on the user logged onto the terminal.

PPPoE exchanges Ethernet frames during the point-to-point connection. The Ethernet frame is a packet structure for transporting data on a Local Area Network (LAN). It typically comprises a destination address (e.g. MAC sub-layer address) identifying the destination terminal of the Ethernet frame and a payload field containing the data to be transported. As DOCISIS also uses Ethernet frames to transport data, PPPoE may be implemented on a DOCSIS cable network. The endpoints of the PPPoE connection, however, must reside in the same network. If a packet has to cross another network, it passes through the routing CMTS. The routing CMTS may alter, among other fields, the destination address of the Ethernet frame (e.g. to an intermediate network device between the source and destination of the Ethernet frame) as it transports the Ethernet frame from one network to another. PPPoE protocol requires that the destination address of an Ethernet frame be the address of an endpoint to a PPPoE connection. Thus, the routing CMTS is incompatible with PPPoE protocol.

The routing CMTS may have to act as a PPPoE termination server to enable PPPoE between terminals not on the same network. It may terminate the PPPoE session at the routing CMTS. Configuring a routing CMTS to act as a PPPoE termination server, however, detracts from the routing CMTS's primary purpose of routing packets between networks.

SUMMARY OF THE INVENTION

The present invention addresses the problem associated with configuring a routing CMTS to act as a PPPoE termination server. The exemplary embodiments of the present invention describe a method and apparatus for establishing a PPPoE connection between endpoints on different networks. The present invention involves configuring a routing CMTS to bridge Ethernet frames related to a PPPoE connection. Bridging makes the routing CMTS transparent to the PPPoE connection. The destination address of the Ethernet frame is not altered as the Ethernet frame passes through the routing CMTS.

According to one exemplary embodiment of the present invention, a routing CMTS may receive an Ethernet frame from a first terminal engaged in a PPPoE connection. It may then transmit the Ethernet frame to a second terminal engaged in the PPPoE session. In the exemplary embodiment, the routing CMTS does not alter the destination address of the Ethernet frame. Thus, endpoints in different networks may establish a PPPoE session without having to configure the routing CMTS to act as a PPPoE termination server.

According to another exemplary embodiment of the present invention, the routing CMTS may receive an Ethernet frame from a first terminal. Then, the routing CMTS may locate an Ether_Type field in the Ethernet frame. The Ether_Type may indicate whether the Ethernet frame is related to a PPPoE connection. The routing CMTS may then compare a status code in the Ether_Type field to a discovery code and a session code. If the status code in the Ether_Type field matches the discovery code or session code, then the Ethernet frame is related to a PPPoE connection. The routing CMTS may then transmit the Ethernet frame to a second terminal engaged in a PPPoE session. The routing CMTS may not alter the destination address of the Ethernet frame. If the Ethernet frames are unrelated to a PPPoE connection (e.g. status code does not match discovery or session code), the routing CMTS may route the Ethernet frame. Thus, the routing functionality of the routing CMTS is preserved.

In yet another exemplary embodiment of the present invention, the routing CMTS may serve as a non-invasive security firewall. The routing CMTS may receive an Ethernet frame from a first terminal. Then, the routing CMTS may locate an Ether_Type field and destination address. The routing CMTS may then compare a status code in the Ether_Type to a discovery code and a session code. If the status code in the Ether_Type field matches a discovery code, then the destination addresss may be stored in the memory. The presence of a discovery code indicates that the Ethernet frame is related to a PPPoE connection to be established. The routing CMTS may store the destination address so as to keep a record of the terminals engaged in a PPPoE connection. The routing CMTS may then transmit the Ethernet frame. The Ethernet frame is related to a PPPoE connection. Thus, the routing CMTS may not alter the destination address of the Ethernet frame.

If the status code in the Ether_Type field matches the session phase code, then the routing CMTS may compare the destination address in the Ethernet frame to a stored address in the memory. The presence of a session code indicates that the Ethernet frame is related to an already established PPPoE connection. Thus, if the destination address matches the stored address, then the routing CMTS may then transmit the Ethernet frame to a second terminal engaged in a PPPoE connection. It may not alter the destination address of the Ethernet frame. If the destination address does not match the stored address, then the routing CMTS may discard the Ethernet frame. The Ethernet frame is not related to a PPPoE session that the routing CMTS recognizes. In an exemplary embodiment, the routing CMTS may act as a firewall and only permit Ethernet frames destined to terminals engaged in a PPPoE connection to pass. Such a configuration may prevent spoofing attacks.

This as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 6 illustrates the operation of a selective bridging CMTS in accordance with an exemplary embodiment of the present invention; and FIG. 7 illustrates the operation of a security CMTS in accordance with an exemplary embodiment of the present invention.

DETAILED DESCRIPTION OF EXEMPLARY EMBODIMENT

1. Exemplary Network Architecture

Figure 1:
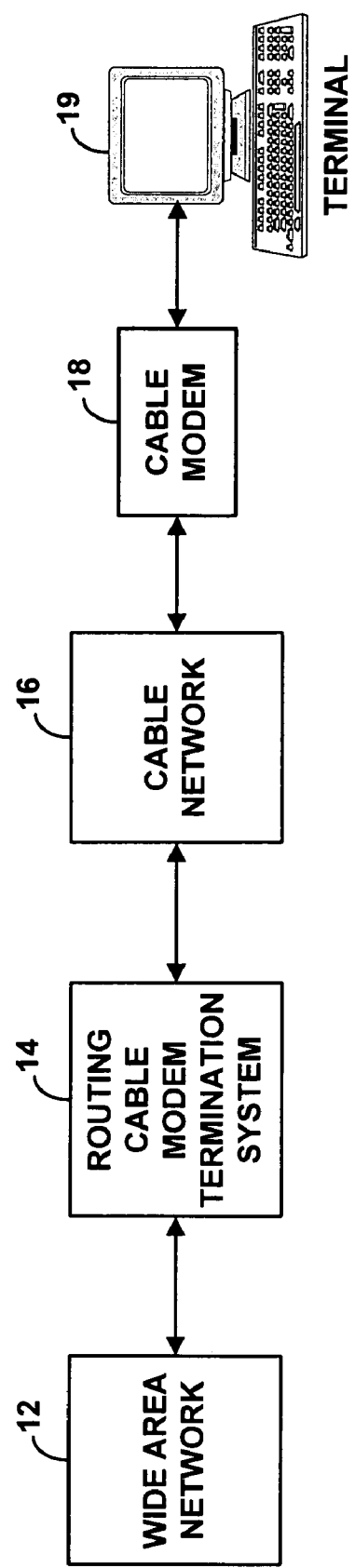
FIG. 1 illustrates the architecture of a cable network conforming to Data Over Cable System Interface Specification (DOCSIS)

Referring to the drawings, FIG. 1 illustrates a simplified diagram of the architecture of a DOSCIS network. This and other arrangements described herein are shown for purposes of illustration only.

Those skilled in the art will appreciate that other network architectures may be used instead, additional elements may be added to these architectures, and some elements may be omitted altogether. Further, as in most network architectures, those skilled in the art will appreciate that many of the elements described herein are functional entities that may be implemented as discrete components or in conjunction with other components in any suitable combination and location.

Still further, various functions described herein may be carried out by a processor programmed to execute computer instructions. Provided with the present disclosure, those skilled in the art can readily prepare appropriate computer instructions to perform such functions.

Referring to FIG. 1, the DOCSIS architecture may have five types of network elements: wide area networks (WANs) 12, cable networks 16, cable modems 18, terminals 19, and routing cable modem termination systems (CMTSs) 14. The DOCSIS cable network may have at least one of each type of network element, each coupled to another network element. For example, the WAN 12 may be coupled to the routing CMTS 14, the cable network 16 may be coupled to the routing CMTS 14, and the cable modem 18 may be coupled to the cable network 18 and to the terminal 19. Other arrangements are also possible.

The terminals on the WAN 12 and cable network 16 may each be a device (e.g. computer, server) or a collection of devices. The WAN 12 and cable network 16 typically comprise terminals networked together and capable of communicating with each other. The WAN 12 may be network for transporting data and the cable network 16 may be a network for transporting data and video signals. The cable modem 18 interfaces the terminal 19 to the cable network 16. It receives packets from the cable network 16 addressed to the terminal 19 to which it is connected and transmits packets onto the cable network 16 from the terminal 19 to which it is connected. Other arrangements are also possible.

The routing CMTS 14 may route packets between the WAN 12 and cable network 16. It may operate at the Network layer and interface the cable network 16 to external data networks. The routing CMTS comprises a routing engine. The routing engine intelligently transports packets from one network to another. It may use a network layer address and MAC sub-layer address to transport packets from a source to a destination according to the shortest path, for example.

Figure 2:
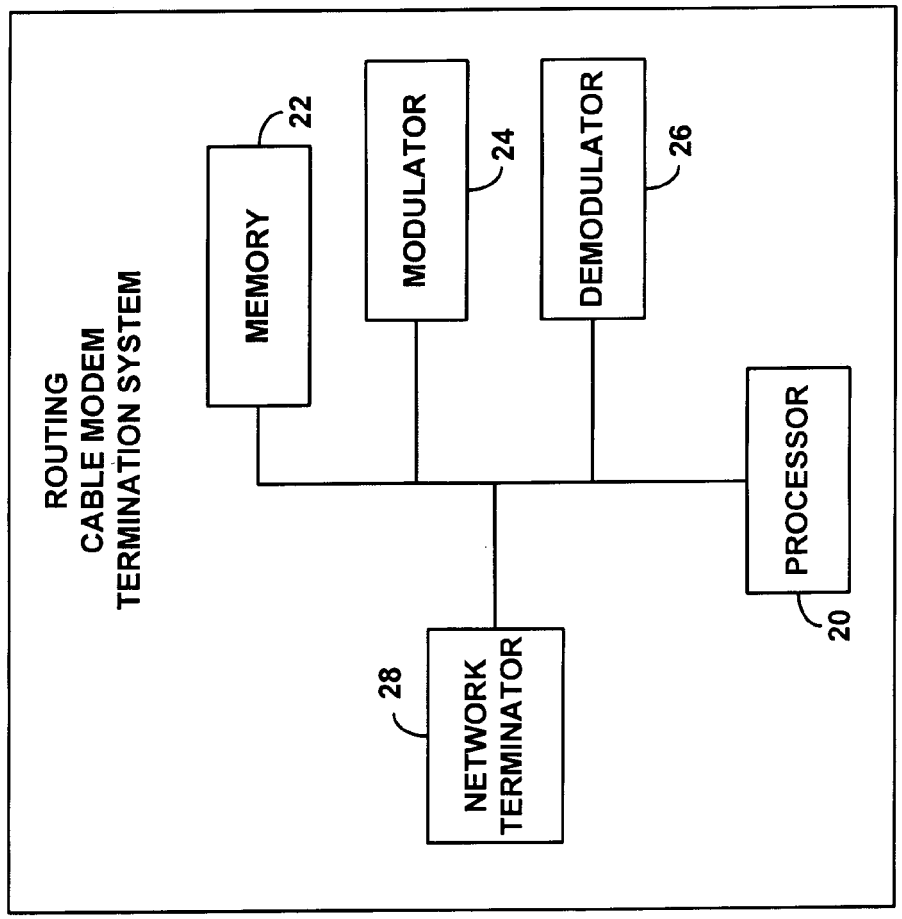
FIG. 2 illustrates the structure of a Cable Modem Termination System (CMTS)

FIG. 2 illustrates the architecture of a routing CMTS. The routing CMTS may comprise a processor 20 coupled to a memory circuit 22, a modulator 24, a demodulator 26, and a network terminator 28. The processor 20 may be a programmable device that controls the operations on the routing CMTS. For example, the processor 20, in conjunction with the modulator 24, may convert digital signals received from the WAN 12 (FIG. 1) into equivalent analog signals for transmission over the cable network 16 (FIG. 1). Similarly, the processor 20, in conjunction with a demodulator 26, may convert analog signals received from the cable network 16 into equivalent digital signals for transmission over the WAN 12. Thus, the modulator may be a transmitter for transmitting packets over the cable network and the demodulator may be a receiver for receiving packets from the cable network.

Unlike the modulator and demodulator, the network terminator 28 may define the interface between the WAN 12 and the routing CMTS 14 (FIG. 1). It may be the point where the cable network provider's services begin and end. The network terminator 28 may also comprise a receiver and transmitter. The receiver may receive packets from the WAN 12 and the transmitter may transmit packets to the WAN 12. As the WAN 12 may be a digital network, the receiver and transmitter may transmit and receive digital signals. Other arrangements are also possible.

2. Point-to-Point Over Ethernet

Typically, the packets that the DOCSIS network transports are called frames. The frames may comprise a header field for addressing information and a payload field for data. The MAC sub-layer address may be part of the header field. The MAC sub-layer address may identify the specific terminal to which the data is destined. One advantage of using a frame containing a MAC-sub-layer address is that it is simplifies the transport of packets to a terminal. The frame's destination is in accordance with the MAC sub-layer address in the frame. One disadvantage of using a MAC sub-layer address is that the network may not be able to provision services at the user-specific level. The MAC sub-layer address may only enable the network to discriminate among physical terminals.

Request for Comments 2516 of the Internet Engineering Task Force, the contents of which is incorporated by reference herein, specifies a protocol for establishing a point-to-point connection over Ethernet (PPPoE). PPPoE enables two-points to identify and authenticate each other according to the user logged into a terminal. Hence, a network using PPPoE may be able to provision services at a user-specific level. For example, user A and user B at the same computer terminal may establish two different PPoE sessions and two different levels of service. User A may be guaranteed a certain level of bandwidth while user B may not.

PPPoE is a frame-based transport protocol. As the structure of the frame in PPPoE may be identical to that in DOCSIS, PPPoE may be integrated into the DOCSIS standard. Therefore, a DOCSIS cable network may be configured to provide network services on a per-user basis.

A. Structure of an Ethernet Frame

Figure 3:
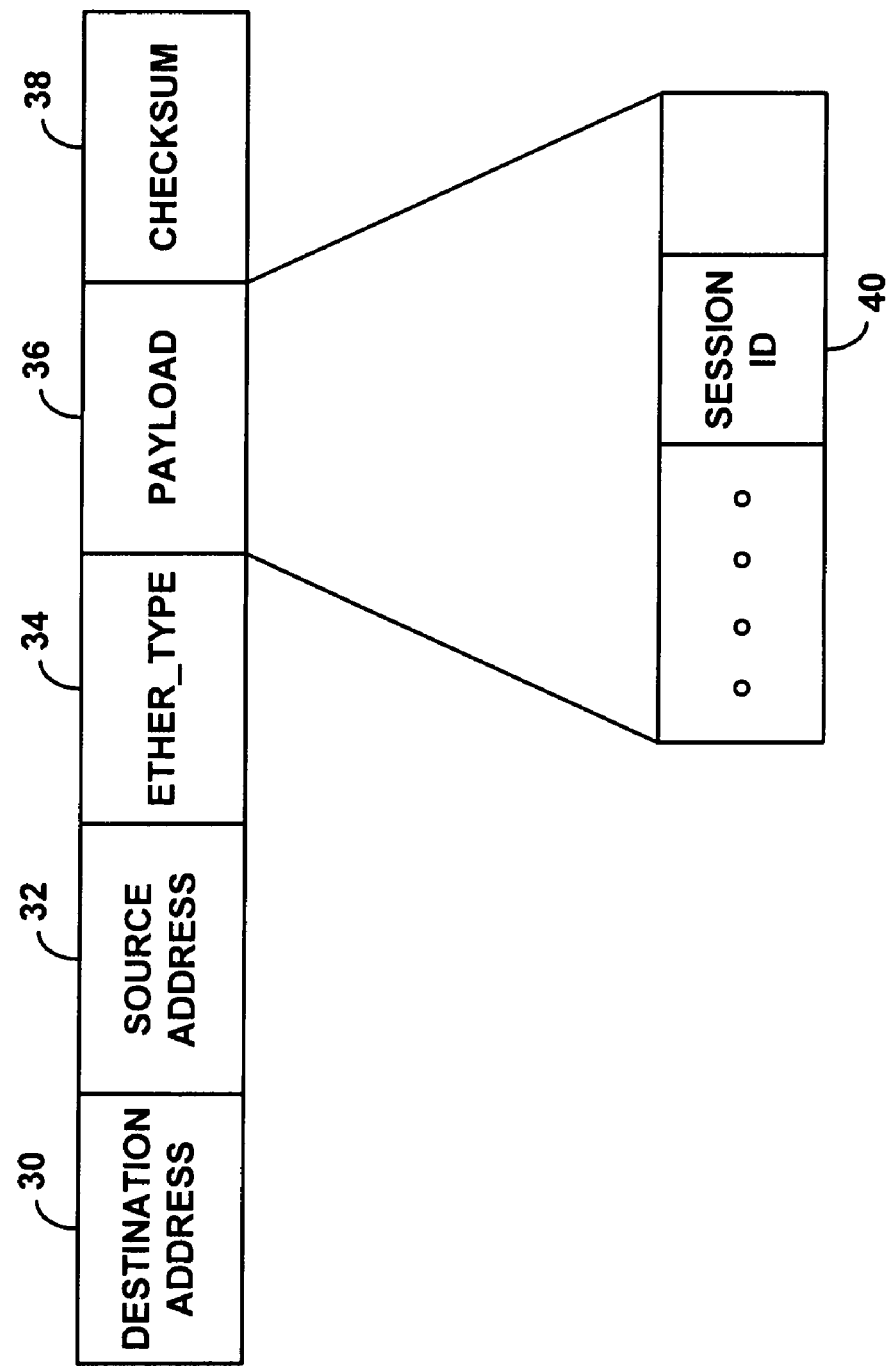
FIG. 3 illustrates the syntax of an Ethernet frame.

The Ethernet frame is a data structure that PPPoE may use to transport data during a PPPoE connection. The Ethernet frame may comprise information for establishing and maintaining a PPPoE connection. FIG. 3 illustrates the structure of a typical Ethernet frame. The Ethernet frame may have at least 5 fields. Other arrangements, however, are also possible.

The Ethernet frame comprises 14 bytes of header fields and up to 1500 bytes of payload data. The first field may be a six byte destination address 30. The destination address 30 may be a unique MAC sub-layer address that identifies the destination terminal of the Ethernet frame. Alternatively, the destination address may be a broadcast address (e.g. 0xFFFFFFFF) that indicates that all terminals are to receive the Ethernet frame. PPPoE protocol requires that the destination address of an Ethernet frame always contain the address of a endpoint to the PPPoE connection.

The second field may be a source address 32. The source address 32, also 6 bytes, may be a unique MAC sub-layer address identifying the source of the Ethernet frame. The third field may be an Ether_Type field 34. The Ether_Type 34 field may be a 2 byte field containing the status of the PPP session. There may be two phases to a PPPoE session: a Discovery phase and Session phase. During Discovery phase, the Ether_Type field 34 may be set to a discovery code, e.g. 0x8863. During Session phase, the Ether_Type field 34 may be set to a session code, e.g. 0x8864. Other codes are also possible.

The fourth field of the Ethernet frame may be a payload field 36. The payload field 36 may contain up to 1500 bytes of data to be transported over the network. The initial bytes of the payload field 36 may be specifically set to indicate that the Ethernet frame contains data related to a PPPoE connection. For example, the payload field may contain a session identifier 40 (session ID). The session ID 40 may be a 16 bit field that identifies a specific PPPoE session. Each user establishing a PPPoE session on the cable network may have his own session identifier. Other arrangements, however, are possible for identifying the PPPoE connections.

The fifth and final field of the Ethernet frame of FIG. 3 may be a checksum field 38. The checksum field 38 may be used for error detection. It may also have additional functions (e.g. error correction).

B. Establishing a PPPoE Connection

The start of a PPPoE session typically requires a host and peer (e.g. two endpoints of the PPPoE session) to exchange Ethernet frames. The exchange of frames enables the host and peer to identify each other and select a session ID. The terminals engaged in a PPPoE connection are typically programmed with PPPoE protocol to establish a PPPoE connection. Therefore, terminals on a DOCSIS network may be programmed with PPPoE protocol to enable PPPoE over the cable network.

There are typically two phases to establishing a PPPoE connection. The first phase may be a Discovery phase. The purpose of the Discovery phase may be for the host and the peer to exchange MAC sub-layer addresses and to select a session ID. The second phase may be a Session phase. The purpose of the Session phase may be for the host and peer to initiate a PPPoE session.

Figure 4:
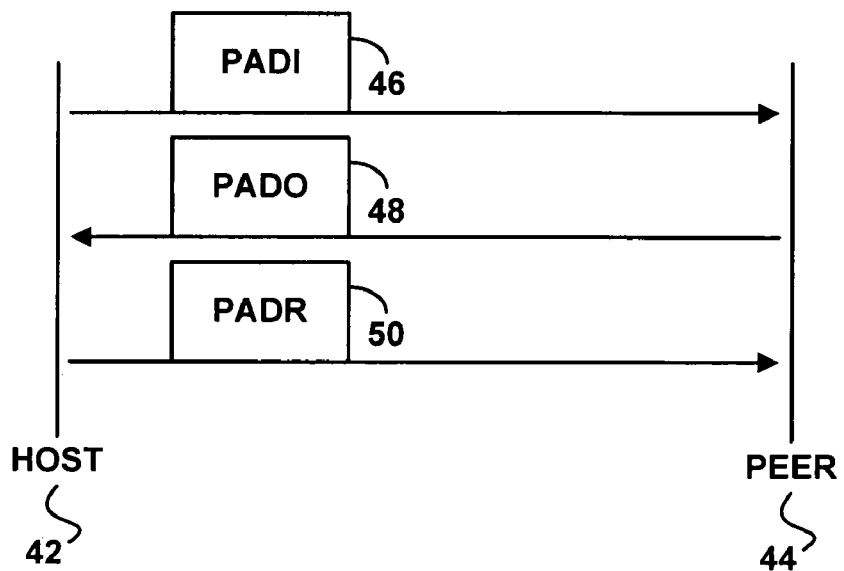
FIG. 4 illustrates the exchange of Ethernet frames during discovery phase communications between a host and peer residing in the DOCSIS network.

FIG. 4 illustrates a typical exchange of Ethernet frames during the Discovery phase. Other arrangements are also possible.

The Discovery phase typically begins, at step 46, with a host 42 sending a PPPoE Active Discovery Initiation frame (PADI) to a peer 44. The PADI is a request by a host 42 to initiate a PPPoE session with a peer 44. The PADI may have the destination address set to a broadcast address so that any peer 44 (e.g. a server) may respond to the host's request.

If the peer 44 receives the PADI and wishes to serve the host 42, it may respond, at step 48, by sending a PPPoE Discovery Offer (PADO) frame. The destination address may be set to the address of the host 42 that sent the PADI. The payload of the PADO may contain the MAC sub-layer address of the peer 44 that is responding. As the host 42 may receive more than one PADO, the host 42 may select the peer 44 with which it wishes to establish a PPPoE session. It may consider information it may have on the specific peer 44, for example, the capabilities and services of the peer. The host 42 may respond to the peer 44 selected by sending, at step 50, a PPPoE Active Discovery Request (PADR) frame. Upon receipt, the peer 44 may generate a unique session identifier (session ID) and exchange it with the host 42. The session ID may identify the specific PPPoE connection between the host 42 and peer 44.

Once the host 42 and the peer 44 have successfully identified each other (e.g. exchanged sessions IDs), the two devices may enter the Session stage. They may establish a point-to-point connection (identified by the session ID) and begin exchanging Ethernet frames according to a specific level of service.

The session ID typically carries the advantages of PPPoE. The session ID may be used to identify every Ethernet frame that belongs to a particular PPPoE session and the particular users associated with the PPPoE connection. The network may use the session ID to provision network services at the user-specific level, rather than at the terminal level.

One type of user-specific service that the session ID may enable is bandwidth allocation. A network entity may use the session ID shape the traffic sent and received by specific users engaged in a PPPoE session. For example, if user A logs into a terminal and establishes a PPPoE session, user A may be assigned a unique session ID. If user A is paying for some guaranteed data rate, a network entity may shape the traffic associated with user A's session ID according to his level of service. If at a later time, user B sits at the same computer and logs in under a different account (e.g. by presenting a different username/password pair), user B may receive a separate session ID. If user B is paying only for a best-effort service, with no bandwidth guarantees, the network entity may apply the appropriate bandwidth management techniques to Ethernet frames with user B's session ID to match user B's level of service. Therefore, the session ID of PPPoE enables a network to provision services at a user-specific level.

3. PPPoE in Cable Networks

PPPoE is an IETF standard designed to connect a host and peer together in the same LAN. If a host and peer are on different networks, then the Ethernet frames that they exchange would pass through a routing device. A routing device may transports Ethernet frames between networks. Part of the routing process may include transmitting Ethernet frames to an intermediate network device. Thus, the routing device may alter the destination address of the Ethernet frame. As PPPoE requires that the destination address of an Ethernet frame be the address of one endpoint to the PPPoE connection, PPPoE is incompatible with the function of routers.

The routing CMTS of a DOCSIS network is a routing device. Thus, to enable terminals on different networks to establish a PPPoE connection, the routing CMTS may be configured to act as a PPPoE termination server. The PPPoE termination server acts like a peer to a PPPoE session. It may terminate the PPPoE connection in the same network as the host.

Configuring a routing CMTS as a PPPoE termination server, however, is not a very efficient solution. First, there are a number of routing CMTSs deployed in a network. If each routing CMTS acts as a PPPoE termination server, the operator would need to collect and collate data from each routing CMTS in order to obtain meaningful accounting and billing data. Second, servers are built specifically for the purpose of PPPoE termination. These highly specialized servers come with a full range of options and features that would have to be duplicated at the routing CMTS in order to match the functionality of dedicated PPPoE termination servers. Third, some operators already have PPPoE termination servers. They would like to continue using the servers they have, rather than configuring routing CMTSs as PPPoE termination servers. Fourth, the computational processing associated with providing PPPoE termination at the routing CMTS would detract from a router's primary purpose, the forwarding and routing of packets between networks.

Therefore, in exemplary embodiments of the present invention, a routing CMTS may be configured to bridge Ethernet frames related to a PPPoE connection. Bridging is the process of transporting an Ethernet frame without altering (among other fields) its destination address. Configuring the routing CMTS to bridge Ethernet frames avoids the problem of configuring the routing CMTS to act like a PPPoE termination server. Those skilled in the art can readily prepare appropriate computer instructions to perform the required functions consistent with the exemplary embodiment of the present invention.

A. Bridging CMTS

Figure 5:
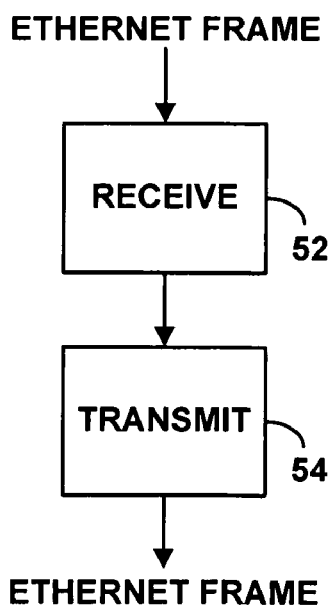
FIG. 5 illustrates the operation of a bridging CMTS in accordance with an exemplary embodiment of the present invention.

FIG. 5 illustrates a step-by-step operation of an exemplary embodiment of the present invention. The routing CMTS may be configured to bridge Ethernet frames, including those that are related to a PPPoE connection. The exemplary embodiment is herein referred to as a bridging CMTS. The bridging CMTS may bridge an Ethernet frame to/from the cable network and to/from the WAN to enable PPPoE over the cable network.

In the bridging CMTS, a step 52 may be for a receiver to receive an Ethernet frame. Then, a step 54 of the bridging CMTS may be for a transmitter to transmit the Ethernet frame. The destination where the bridging CMTS may transmit the Ethernet frame may be the terminal identified by the destination address in the Ethernet frame when it was received. Thus, the bridging CMTS may transmit the Ethernet frame to a second terminal engaged in the PPPoE connection if the Ethernet frame is related to a PPPoE connection. The bridging CMTS facilitates PPPoE connections between terminals on different networks because it does not alter the destination address. The Ethernet frame retains the address of the second terminal engaged in the PPPoE connection.

B. Selective Bridging CMTS

A routing CMTS configured to route Ethernet frames operates more efficiently than a routing CMTS configured to bridge Ethernet frames. The routing CMTS may transport an Ethernet packet from a source to destination by minimizing a given criteria (e.g. shortest path, minimum delay). Therefore, in an another exemplary embodiment of the present invention, a routing CMTS may be configured to selectively bridge some Ethernet frames and route other Ethernet frames. Again, those skilled in the art can readily prepare appropriate instructions (e.g. software) to perform the required functions consistent with the exemplary embodiment of the present invention.

FIG. 6 illustrates the step-by-step operation of the routing CMTS configured to selectively bridge Ethernet frames. The routing CMTS configured in such a manner is herein referred to as selective bridging CMTS. The selective bridging CMTS may treat Ethernet frames related to a PPPoE connection differently from those not related to a PPPoE connection. Specifically, the selective bridging CMTS may bridge Ethernet frames related to a PPPoE connection and route other Ethernet frames. Thus, a first step may be to determine if an Ethernet frame is related to a PPPoE connection.

At step 56, a receiver on the selective bridging CMTS may receive an Ethernet frame from a first terminal. Then, a step 58 may be for the selective bridging CMTS to store the Ethernet frame in a memory (e.g. RAM). A step 60 may be to locate an Ether_Type field in the Ethernet frame, for example, by parsing the contents in the Ethernet frame.

A step 62 may be to compare a status code in the Ether_Type field of the Ethernet frame to a discovery code (e.g. 0x8863) and session code (e.g. 0x8864). If the status code in the Ether type field matches a discovery code or session code, then the Ethernet frame may be related to a PPPoE connection (e.g. discovery or session phase). A step 64 may be for a transmitter to transmit the Ethernet frame in the memory to a second terminal engaged in a PPPoE connection. In transmitting the Ethernet frame, the selective bridging CMTS may not alter the destination address of the Ethernet frame. Thus, the selective bridging CMTS enables terminals on different networks to engage in a PPPoE connection.

If the status code in the Ether_Type does not match the discovery code or session code, then the Ethernet frame may not be related to a PPPoE session. At step 66, the selective bridging CMTS may route the Ethernet frame. The selective bridging CMTS may act as a router when the Ethernet frame is not related to a PPPoE connection so as to efficiently route Ethernet frames from a source to a destination.

One advantage of selective bridging CMTS is that it enables the PPPoE to work outside a single network without reconfiguring the router to operate in a pure bridge mode. Furthermore, it enables routers to be placed between PPPoE hosts and peers, without the need for routers to terminate the PPPoE session. With selective bridging, the network operator may continue to use routers instead of bridges, but at the same time enable PPPoE on its network.

C. Security CMTS

A further advantage of the selective bridging CMTS is that it may keep track of PPPoE connections between terminals. The CMTS may use such information to maintain network security. In yet another exemplary embodiment of the present invention, the routing CMTS may be configured to keep state information on the exchange between a host and peer in a PPPoE session so as to perform security functions.

FIG. 7 illustrates a step-by-step operation of the exemplary embodiment of the present invention. The routing CMTS may be configured to bridge Ethernet frames destined to terminals behind the routing CMTS (e.g. on the cable network) that are engaged in a PPPoE connection. The exemplary embodiment is herein referred to as a security CMTS. A function of the security CMTS may be to act as a non-invasive security firewall to prevent spoofing attacks.

The security CMTS may operate similarly to the selective bridging CMTS. Specifically, it may identify Ethernet frames related to a PPPoE connection from those that are not related. The security CMTS may differ from the selective bridging CMTS in that it records the destination addresses of terminals engaged in PPPoE connections. It only bridges those Ethernet frames destined to terminals engaged in a PPPoE connection.

In the security CMTS, a step 84 may be for a receiver on the security CMTS to receive an Ethernet frame from a first network. A step 86 may be to store the Ethernet frame in a memory (e.g. RAM). A step 88 may be to locate an Ether_Type field and destination address in the Ethernet frame, for example, by parsing the contents of the Ethernet frame. The purpose may be to examine the Ether_Type field to determine whether the Ethernet frame is related to a PPPoE connection.

A step 68 may be to compare a status code in the Ether_Type field to a discovery code (e.g. 0x8863) or session code (e.g. 0x8864). If the status code in the Ether_Type field matches a discovery code, then the Ethernet frame may be related to a PPPoE connection (e.g. discovery phase). A step 70 may be to store the destination address of the Ethernet frame in the memory, for example in a stored list. The presence of the discovery code indicates that the Ethernet frame is related to PPPoE connection to be established. The security CMTS may store the address so as to keep a record of the terminals engaged in a PPPoE connection.

As a step 72, a transmitter may then transmit the Ethernet frame to a second terminal engaged in a PPPoE connection. The Ethernet frame is related to a PPPoE connection. Thus, it may not alter the destination address of the Ethernet frame.

If the status code in the Ether_Type field matches a session code, a step 76 may be to determine if the destination address matches an address in the stored list. If so, a step 78 may be for the transmitter to transmit the Ethernet frame to a second terminal engaged in a PPPoE connection. The Ethernet frame may be related to a recognized PPPoE session (because the address matches a PPPoE connection recorded during discovery phase). Thus, the destination address of the Ethernet frame may not be altered.

If the Ethernet frame address does not match the stored address, then a step 80 may be to discard (e.g. not transmit) the Ethernet frame. Only those Ethernet frames with an Ethernet frame address corresponding to a host or peer on the cable network engaged in a PPPoE connection may be bridged. If the Ether-Type field does not match the discovery code or session code, then a step 82 may be to also discard the Ethernet frame. The Ethernet frame may not be related to a PPPoE connection if the Ether_Type field does not match either codes.

Exemplary embodiments of the present invention have thus been illustrated and described. It will be understood, however, that changes and modifications may be made to the invention, as described, without deviating from the spirit and scope of the invention, as defined by the following claims.

We claim:

1. A routing device operable to selectively bridge Ethernet frames related to a Point-to-Point Protocol over Ethernet (PPPoE) connection, the routing device comprising:
   a processor;
   memory;
   computer instructions stored in the memory and executable by the processor to perform the functions including:
      receiving an Ethernet frame from a first terminal, the Ethernet frame comprising an Ether_Type field and a destination address;
      storing the Ethernet frame in the memory;
      locating the Ether_Type field in the Ethernet frame;
      determining whether the Ether_Type field includes a discovery code or a session code identifying status of a PPPoE connection, wherein the Ether_Type field including the discovery code or the session code indicates that the Ethernet frame is related to the PPPoE connection;
      in response to a determination that the Ether_Type field includes the discovery code or the session code, bridging the Ethernet frame to a second terminal engaged in the PPPoE connection, the destination address of the Ethernet frame addressing the second terminal; and
      in response to a determination that that the Ether_Type field does not include the discovery code or the session code, routing the Ethernet frame to the second terminal.

2. The routing device of claim 1, wherein the destination address of the Ethernet frame is a MAC sub-layer address.

3. In a routing device, a method for selectively bridging Ethernet frames related to a Point-to-Point Protocol over Ethernet (PPPoE) connection, the method comprising:
   receiving an Ethernet frame from a first terminal, the Ethernet frame comprising an Ether_Type field and a destination address;
   storing the Ethernet frame in a memory;
   locating the Ether_Type field in the Ethernet frame;
   determining whether the Ether_Type field includes a discovery code or a session code identifying status of a PPPoE connection, wherein the Ether_Type field including the discovery code or the session code indicates that the Ethernet frame is related to the PPPoE connection;
   in response to a determination that the Ether_Type field includes the discovery code or the session code, bridging the Ethernet frame to a second terminal engaged in the PPPoE connection, the destination address of the Ethernet frame addressing the second terminal; and
   in response to a determination that that the Ether_Type field does not include the discovery code or the session code, routing the Ethernet frame to the second terminal.

\* \* \* \* \*